US006725112B1

United States Patent
Kaminsky et al.

(10) Patent No.: US 6,725,112 B1
(45) Date of Patent: Apr. 20, 2004

(54) METHOD, SYSTEM AND STORAGE MEDIUM FOR OPTIMIZING A PRODUCT DESIGN

(75) Inventors: John Kaminsky, Rensselaer, NY (US); Mandar K. Chati, Niskayuna, NY (US); Matthew F. Niemeyer, North Chatham, NY (US); Mohamed Ahmed Ali, Halfmoon, NY (US); Rick N. Williams, Pittsfield, MA (US)

(73) Assignee: General Electric Company, Pittsfield, MA (US)

( * ) Notice: Subject to any disclaimer, the term of this patent is extended or adjusted under 35 U.S.C. 154(b) by 707 days.

(21) Appl. No.: 09/594,975

(22) Filed: Jun. 15, 2000

Related U.S. Application Data
(60) Provisional application No. 60/162,447, filed on Oct. 29, 1999.

(51) Int. Cl.[7] .............................................. G06F 19/00
(52) U.S. Cl. ................... 700/97; 700/103; 700/117; 700/197; 703/2
(58) Field of Search .................... 700/97, 98, 103–105, 700/117, 29, 30, 33, 197, 200; 703/2, 1; 702/84, 109

(56) References Cited

U.S. PATENT DOCUMENTS

| | | | |
|---|---|---|---|
| 5,109,337 A | 4/1992 | Ferriter et al. ............... 364/401 |
| 5,253,331 A | 10/1993 | Lorenzen et al. ............. 395/50 |
| 5,278,751 A | 1/1994 | Adiano et al. ............... 364/402 |
| 5,552,995 A | 9/1996 | Sebastian ............... 364/468.03 |
| 5,717,598 A | 2/1998 | Miyakawa et al. .... 364/468.09 |
| 5,748,943 A | 5/1998 | Kaepp et al. ................ 395/500 |
| 5,822,206 A | 10/1998 | Sebastian et al. ....... 364/468.03 |
| 5,933,348 A | 8/1999 | Kurtzberg et al. ..... 364/468.09 |
| 6,064,919 A | * 5/2000 | Slusarczyk ................... 700/117 |
| 6,377,908 B1 | * 4/2002 | Ostrowski et al. ............. 703/2 |

OTHER PUBLICATIONS

Hatch et al, "Transfer Function Development for the Injection Molding of Optical Media", Proceedings of the 1999 Annual Technical Conference ANTEC, May 1999, pp. 810–814 XP 001051339.

David Kazmer et al, "Theory of Constraints for Design and Manufacture of Thermoplastic Parts", Proceedings of the 1998 56th Annual technical Conference, ANTEC. Part 3 (Of 3); Atlanta, GA, USA, Apr. 26–30 1998,.vol. 3, 1998, pp. 3068–3072, XP001051337.

Hatch et al, "Process Transfer Function for Optical Media Manufacturing", Int J Adv Manuf Technol; International Journal of Advanced Manufacturing Technology 2001, vol. 18, No. 5, 2001, pp. 357–365, XP001034738.

* cited by examiner

*Primary Examiner*—Leo Picard
*Assistant Examiner*—Steven R. Garland

(57) ABSTRACT

An exemplary embodiment of the invention is a method for optimizing a product design. The method includes specifying a plurality of application parameters for the product. A plurality of predetermined factors and responses are obtained in response to the plurality of application parameters. A transfer function is obtained which relates at least one factor to at least one response. The transfer function is optimized in response to user-defined optimization criteria to generate an optimized factor and an optimized response. The optimized factor and the optimized response are then displayed.

25 Claims, 17 Drawing Sheets

| ENGINEERING CALCULATOR | | | | | SELECT GEOMETRY | |
|---|---|---|---|---|---|---|
| | | | | | | |
| MATERIAL NAME | LEXAN LS2 | | | | | |
| MATERIAL DATABASE | GEP | | SELECT MATERIAL   box | STRIP   PLAQUE | DISK | |
| MATERIAL PRICE | $2.20 | | | | | |
| FACTOR (X'S) | | | RESPONSES (Y'S) | | | |
| | | | | | | |
| GEOMETRY X'S | | | PERFORMANCE Y'S | | | |
| FACTOR NAME | VALUE | UNITS | RESPONSE NAME | VALUE | UNITS | |
| PART LENGTH | 500 | mm | DEFLECTION | | mm | |
| PART WIDTH | 250 | mm | STRESS | 152.713 | MPa | |
| PART DEPTH | 150 | mm | EFFECTIVE MODULUS | 39.469 | MPa | |
| THICKNESS | 2 | mm | ENERGY ABSORBED | 0 | BTU | |
| FLOW LENGTH | 429.5085 | mm | CYCLES TO FAILURE | 0 | | |
| LOADING AND BOUNDARY CONDITIONS | | | PROCESSING Y'S | | | |
| FACTOR NAME | VALUE | UNITS | RESPONSE NAME | VALUE | UNITS | |
| TEMPERATURE | 500 | C | MELT PRESSURE TO FILL | 414.02 | MPa | |
| TIME | 250 | HOURS | INJECTION ENERGY | | MPa*S | |
| LOAD TYPE | POINT | | MAX SHEAR RATE | 3791.283 | 1/S | |
| POINT LOAD | 300 | N | COOLING TIME | 12.39868 | SEC | |
| DISTRIBUTED LOAD | 1 | Pa | CYCLE TIME | 20.89868 | SEC | |
| EDGE CONDITIONS | SIMPLE | | CLAMP FORCE | 7848.828 | TONS | |
| DROP HEIGHT | 0.5 | m | SHRINKAGE (FLOW) | 0.53 | % | |
| MAX. CYCLIC STRESS | 2 | MPa | SHRINKAGE (CROSS-FLOW) | 0.53 | % | |
| PROCESSING X'S | | | WARP INDEX | 0 | | |
| FACTOR NAME | VALUE | UNITS | PART VOLUME | 700 | cm^3 | |
| MELT TEMPERATURE | 304.45 | C | PART WEIGHT | 0.84 | kg | |
| MOLD TEMPERATURE | 82.2 | C | COST Y'S | | | |
| INJECTION TIME | 5.5 | sec | RESPONSE NAME | VALUE | UNITS | |
| PACKING PRESSURE | 42.5 | MPa | PRODUCTION TIME | 7.256485 | WEEKS | |
| MOLD OPEN TIME | 3 | sec | PROCESSING COST | 0.58 | $/PART | |
| MACHINE X'S | | | MATERIAL COST | 1.85 | $/PART | |
| FACTOR NAME | VALUE | UNITS | TOOLING COST | 0.25 | $/PART | |
| MACHINE LABOR RATE | $100.00 | $/HR | TOTAL COST | 2.68 | $/PART | |
| PRODUCTION VOLUME | 100000 | PARTS | | | | |
| NUMBER OF TOOLS | 1 | # | | | | |
| NUMBER OF CAVITIES | 2 | #/TOOL | | | | |
| TOOL AVAILABILITY | 40 | HRS/WEEK | | | | |
| TOOL COST | 50000 | $ / TOOL | | | | |
| MISCELLANEOUS X'S | | | | | | |
| FACTOR NAME | VALUE | UNITS | | | | |
| STRAIN TO FAILURE | 0.95 | | | | | |

FIG.3

| APPLICATION DATA (X'S) | | | ⬅ | ➡ | ✳ |
|---|---|---|---|---|---|
| | | | | | |
| | | | | | |
| SELECT PART GEOMETRY:<br>(RED TEXT SHOWS CURRENT SELECTION) | box | STRIP | PLAQUE | DISK | |
| | | | | | |

| | | GEOMETRY FACTORS | | | |
|---|---|---|---|---|---|
| DOE | FACTOR NAME | VALUE | STD DEV | LOW | HIGH | UNITS |
| ☐ | PART LENGTH | 200 | | | | mm |
| ☐ | PART WIDTH | 150 | | | | mm |
| ☐ | PART DEPTH | 50 | | | | mm |
| ☐ | THICKNESS | 2 | | | | mm |
| ☐ | FLOW LENGTH | 175 | | | | mm |
| | | LOADING AND BOUNDARY CONDITIONS | | | | |
| DOE | FACTOR NAME | VALUE | STD DEV | LOW | HIGH | UNITS |
| ☐ | TEMPERATURE | 55 | | | | |
| ☐ | TIME | 1 | | | | |
| | LOAD TYPE | PART ▽ | | | | |
| ☐ | POINT LOAD | 300 | | | | |
| ☐ | DISTRIBUTED LOAD | 1 | | | | |
| | EDGE CONDITIONS | SIMPLE ▽ | | | | |
| ☐ | DROP HEIGHT | 0.5 | | | | |
| ☐ | MAX. CYCLIC STRESS | 2 | | | | |
| USER FACTORS | | | | | | |
| DOE | FACTOR NAME | VALUE | STD DEV | LOW | HIGH | UNITS |
| ☑ | APPFACTOR | | | 25 | 75 | |

FIG.4

| MATERIAL SELECTION | | | | | | |
|---|---|---|---|---|---|---|
| | | SELECTED MATERIAL —86 | | | | |
| | SELECTED MATERIALS | | | | | |
| ALIAS NAME | MATERIAL | DATABASE | PRICE | | REMOVE | |
| LEXAN LS2 | LEXAN LS2 | GEP | $2.10 | | | |
| NORYL731 | NORYL731 | GEP | $1.90 | | | |

FIG.5

| RESPONSES (Y'S) | | | | | | |
|---|---|---|---|---|---|---|
| | | PERFORMANCE | | | | |
| DOE | RESPONSE NAME | OPT TYPE | LSL | TARGET | USL | UNITS |
| ☐ | DEFLECTION | NONE ▽ | | | | mm |
| ☐ | STRESS | NONE ▽ | | | | MPa |
| ☐ | EFFECTIVE MODULUS | NONE ▽ | | | | MPa |
| ☐ | ENERGY ABSORBED | NONE ▽ | | | | MPa |
| ☐ | CYCLES TO FAILURE | NONE ▽ | | | | |
| | | PROCESSING Y'S | | | | |
| DOE | RESPONSE NAME | OPT TYPE | LSL | TARGET | USL | UNITS |
| ☑ | MELT PRESSURE TO FILL | MINIMIZE ▽ | | | | MPa |
| ☐ | INJECTION ENERGY | NONE ▽ | | | | MPa*s |
| ☐ | MAX SHEAR RATE | NONE ▽ | | | | 1/S |
| ☐ | COOLING TIME | NONE ▽ | 10 | 20 | 30 | SEC |
| ☑ | CYCLE TIME | NONE ▽ | | | | SEC |
| ☐ | CLAMP FORCE | MINIMIZE ▽ | | | | TONS |
| ☐ | SHRINKAGE (FLOW) | NONE ▽ | | | | % |
| ☐ | SHRINKAGE (CROSS-FLOW) | NONE ▽ | | | | % |
| ☐ | WARP INDEX | NONE ▽ | | | | |
| ☐ | PART VOLUME | NONE ▽ | | | | cm^3 |
| ☐ | PART WEIGHT | NONE ▽ | | | | kg |
| | | COST Y'S | | | | |
| DOE | RESPONSE NAME | OPT TYPE | LSL | TARGET | USL | UNITS |
| ☐ | PRODUCTION TIME | NONE ▽ | | | | WEEKS |
| ☐ | PROCESSING COST | NONE ▽ | | | | $/PART |
| ☐ | MATERIAL COST | NONE ▽ | | | | $/PART |
| ☐ | TOOLING COST | NONE ▽ | | | | $/PART |
| ☐ | TOTAL COST | NONE ▽ | | | | $/PART |
| USER RESPONSES | | | | | ADD | DELETE |
| DOE | RESPONSE NAME | OPT TYPE | LSL | TARGET | USL | UNITS |
| ☑ | RESPONSE | NONE ▽ | | | | METRUNIT |

FIG. 6

| FACTORS (X'S) | | | | | | |
|---|---|---|---|---|---|---|
| MATERIAL: | LEXAN LS2 | | | | | |
| | 116 | 109 PROCESS FACTORS | | 110 | 112 | 114 |
| DOE | FACTOR NAME | VALUE | STD DEV | LOW | HIGH | UNITS |
| ☑ | MELT TEMPERATURE | 304.45 | | 293.3 | 315.6 | C |
| ☑ | MOLD TEMPERATURE | 82.2 | | 71.1 | 93.3 | C |
| ☑ | INJECTION TIME | 5.5 | | 1 | 5 | SEC |
| ☐ | PACKING PRESSURE | 42.5 | | 25 | 50 | MPa |
| | MOLD OPEN TIME | 3 | | | | SEC |
| | COST FACTORS | | | | | |
| DOE | FACTOR NAME | VALUE | STD DEV | LOW | HIGH | UNITS |
| | MACHINE LABOR RATE | $100.00 | | | | $/HR |
| | PRODUCTION VOLUME | 100000 | | | | PARTS |
| | NUMBER OF TOOLS | 1 | | | | # |
| | NUMBER OF CAVITIES | 2 | 10 | 20 | 30 | #/TOOL |
| | TOOL AVAILABILITY | 40 | | | | HRS/WEEK |
| | TOOLING COST | 50000 | | | | $/TOOL |
| | OTHER FACTORS | | | | | |
| DOE | FACTOR NAME | VALUE | STD DEV | LOW | HIGH | UNITS |
| ☐ | STRAIN TO FAILURE | 0.95 | | | | |
| | 118 | | | | | |
| USER FACTORS | | | | | ADD | DELETE |
| DOE | FACTOR NAME | VALUE | STD DEV | LOW | HIGH | UNITS |
| ☑ | MALT FACTOR | | | 20 | 50 | METRUNIT |

FIG. 7

| FACTOR/ENGINEERING SUMMARY | | | | | | |
|---|---|---|---|---|---|---|
| MATERIAL NAME | LEXAN LS2 | | | | | |
| MATERIAL DATABASE | GEP | | | CALCULATE | | |
| MATERIAL PRICE | $2.10 | | | | | |

| FACTOR (X'S) | | | | | | |
|---|---|---|---|---|---|---|
| GEOMETRY FACTORS | | | | | | |
| DOE | FACTOR NAME | VALUE | STD DEV | LOW | HIGH | UNITS |
| ☐ | PART LENGTH | 200 | | | | mm |
| ☐ | PART WIDTH | 150 | | | | mm |
| ☐ | PART DEPTH | 50 | | | | mm |
| ☐ | THICKNESS | 2 | | | | mm |
| ☐ | FLOW LENGTH | 175 | | | | mm |
| LOADING AND BOUNDARY CONDITIONS | | | | | | |
| DOE | FACTOR NAME | VALUE | STD DEV | LOW | HIGH | UNITS |
| ☐ | TEMPERATURE | 55 | | | | C |
| ☐ | TIME | 1 | | | | HOURS |
| | LOAD TYPE | POINT ▽ | | | | |
| ☐ | POINT LOAD | 300 | | | | N |
| ☐ | DISTRIBUTED LOAD | 1 | | | | Pa |
| | EDGE CONDITIONS | SIMPLE ▽ | | | | |
| ☐ | DROP HEIGHT | 0.5 | | | | m |
| ☐ | MAX. CYCLIC STRESS | 2 | | | | MPa |
| PROCESS FACTORS | | | | | | |
| | FACTOR NAME | VALUE | STD DEV | LOW | HIGH | UNITS |
| ☑ | MELT TEMPERATURE | 304.45 | | 293.3 | 315.6 | C |
| ☑ | MOLD TEMPERATURE | 82.2 | | 71.1 | 93.3 | C |
| ☑ | INJECTION TIME | 5.5 | | 1 | 5 | sec |
| ☐ | PACKING PRESSURE | 42.5 | | 35 | 50 | Mpa |
| | MOLD OPEN TIME | 3 | | | | sec |
| COST FACTORS | | | | | | |
| DOE | FACTOR NAME | VALUE | STD DEV | LOW | HIGH | UNITS |
| | MACHINE LABOR RATE | $100.00 | | | | $/HR |
| | PRODUCTION VOLUME | 100000 | | | | PARTS |
| | NUMBER OF TOOLS | 1 | | | | # |
| | NUMBER OF CAVITIES | 2 | | | | #/TOOL |
| | TOOL AVAILABILITY | 40 | | | | HRS/WEEK |
| | TOOL COST | 50000 | | | | $ / TOOL |
| OTHER FACTORS | | | | | | |
| DOE | FACTOR NAME | VALUE | STD DEV | LOW | HIGH | UNITS |
| ☐ | STRAIN TO FAILURE | 0.95 | | | | |
| OTHER FACTORS | | | | | ADD | DELETE |
| DOE | FACTOR NAME | VALUE | STD DEV | LOW | HIGH | UNITS |
| ☑ | APPFACTOR | | | 25 | 75 | METRUNIT |
| ☑ | APPFACTOR | | | 20 | 50 | METRUNIT |

FIG. 8A

| RESPONSES (Y'S) | | | | | | |
|---|---|---|---|---|---|---|
| PERFORMANCE Y'S —126 | | | | | | |
| DOE | RESPONSE NAME | VALUE | OPT TYPE | LSL | TARGET | USL | UNITS |
| ☐ | DEFLECTION | | NONE ▽ | | | | mm |
| ☐ | STRESS | 0.002 | NONE ▽ | | | | MPa |
| ☐ | EFFECTIVE MODULUS | 2344.217 | NONE ▽ | | | | MPa |
| ☐ | ENERGY ABSORBED | 0 | NONE ▽ | | | | MPa |
| ☐ | CYCLES TO FAILURE | 0 | NONE ▽ | | | | |
| PROCESSING Y'S | | | | | | |
| DOE | RESPONSE NAME | | OPT TYPE | LSL | TARGET | USL | UNITS |
| ☑ | MELT PRESSURE TO FILL | 178.91 | MINIMIZE ▽ | | | | MPa |
| ☐ | INJECTION ENERGY | | NONE ▽ | | | | MPa*s |
| ☐ | MAX SHEAR RATE | 853.8067 | NONE ▽ | | | | 1/S |
| ☑ | COOLING TIME | 12.39868 | NONE ▽ | 10 | 20 | 30 | SEC |
| ☐ | CYCLE TIME | 20.89868 | TARGET ▽ | | | | SEC |
| ☐ | CLAMP FORCE | 775.6904 | NONE ▽ | | | | TONS |
| ☐ | SHRINKAGE (FLOW) | 0.53 | NONE ▽ | | | | % |
| ☐ | SHRINKAGE (CROSS-FLOW) | 0.53 | NONE ▽ | | | | % |
| ☐ | WARP INDEX | 0 | NONE ▽ | | | | |
| ☐ | PART VOLUME | 130 | NONE ▽ | | | | cm^3 |
| ☐ | PART WEIGHT | 0.156 | NONE ▽ | | | | kg |
| COST Y'S | | | | | | |
| DOE | RESPONSE NAME | | OPT TYPE | LSL | TARGET | USL | UNITS |
| ☐ | PRODUCTION TIME | 7.256485 | NONE ▽ | | | | WEEKS |
| ☐ | PROCESSING COST | 0.58 | NONE ▽ | | | | $/PART |
| ☐ | MATERIAL COST | 0.33 | NONE ▽ | | | | $/PART |
| ☐ | TOOLING COST | 0.25 | NONE ▽ | | | | $/PART |
| ☑ | TOTAL COST | 1.16 | NONE ▽ | | | | $/PART |
| USER RESPONSES | | | | | ADD | DELETE |
| DOE | RESPONSE NAME | | OPT TYPE | LSL | TARGET | USL | UNITS |
| ☑ | RESPONSE | | NONE ▽ | | | | METRUNIT |

| DOE SETUP | | | | |
|---|---|---|---|---|
| SUMMARY OF SELECTED DATA FOR DOE'S | | | | |
| MATERIALS | | | 3-LEVEL DEFAULT DOE | |
| ID | NAME | | | |
| 1 | LEXAN LS2 | | DOE ADVISOR | |
| 2 | NORYL731 | | | |
| | | | CUSTOM DOE | |
| FACTORS | | | | |
| ID | NAME | | | |
| 1 | MELT TEMPERATURE | | | |
| 2 | MOLD TEMPERATURE | | | |
| 3 | INJECTION TIME | | | |
| | | | | |
| RESPONSES | | | | |
| ID | NAME | | | |
| 1 | MELT PRESSURE TO FILL | | | |
| 2 | CYCLE TIME | | | |
| 3 | TOTAL COST | | | |

132 — MATERIALS section
134 — FACTORS section
136 — RESPONSES section
130 — DOE options

| PERFORM DOE | PERFORM AREA | RUN DOE ALL MATS | REGRESSION | | | | | |
|---|---|---|---|---|---|---|---|---|
| MATERIAL: | NORYL731 | | | | | | | |
| FACTOR (X) | LOW | HIGH | UNITS | | RESPONSE (Y) | UNITS | | |
| MELT TEMPERATURE | 282.2000122 | 310 | C | | MELT PRESSURE | MPa | | |
| MOLD TEMPERATURE | 76.69999695 | 104.4000015 | C | | CYCLE | SEC | | |
| INJECTION TIME | 1 | 4 | SEC | | TOTAL COST | $/PART | | |
| DOE | ☐ CODED | RANDOMIZE | ADD RUNS | ADD REPS | ADD VAL | | | |
| MATRIX | | | | | | | | |
| RUN | MELT TEMP | MOLD TEMP | TINJ | MELTP | TCYCLE | TOTAL COST | | |
| 1 | 282.2000122 | 76.69999695 | 1 | 98.08999634 | 17.80506134 | 1.01 | | |
| 2 | 310 | 76.69999695 | 1 | 74.52999878 | 18.24765015 | 1.02 | | |
| 3 | 282.2000122 | 104.4000015 | 1 | 93.19999695 | 17.30000687 | 0.99 | | |
| 4 | 310 | 104.4000015 | 1 | 70.44000244 | 17.80675888 | 1.01 | | |
| 5 | 282.2000122 | 76.69999695 | 4 | 150.910037 | 20.80506134 | 1.09 | | |
| 6 | 310 | 76.69999695 | 4 | 121.0299988 | 21.24765015 | 1.1 | | |
| 7 | 282.2000122 | 104.4000015 | 4 | 131.8200073 | 20.30000687 | 1.08 | | |
| 8 | 310 | 104.4000015 | 4 | 104.910037 | 20.80675888 | 1.09 | | |
| 9 | 296.1000061 | 90.54999924 | 2.5 | 93.58000183 | 19.53416443 | 1.05 | | |
| 10 | 296.1000061 | 104.4000015 | 2.5 | 101.0599976 | 19.06257629 | 1.04 | | |
| 11 | 296.1000061 | 90.54999924 | 4 | 126.6699982 | 20.80591011 | 1.09 | | |
| 12 | 296.1000061 | 90.54999924 | 2.5 | 120.3899994 | 19.061684 | 1.04 | | |
| 13 | 296.1000061 | 76.69999695 | 2.5 | 112.0800018 | 19.53337097 | 1.05 | | |
| 14 | 296.1000061 | 90.54999924 | 1 | 83.69999695 | 17.80591011 | 1.01 | | |
| 15 | 296.1000061 | 90.54999924 | 2.5 | 105.5899963 | 19.30591011 | 1.05 | | |
| VALIDATION RUNS: | | | | | | | | |

OPTIMIZATION

MATERIAL: LEXAN LS2 — 134

[UPDATE] [TOGGLE CALC MODE] [VAR PART] [SENS] [CORR]

FACTORS (X'S) — 134

| OPT | NAME | VALUE | STD DEV | LOW | HIGH | UNITS |
|---|---|---|---|---|---|---|
| ✓ | MELT TEMP | 315.6 | | 293.3 | 315.6 | C |
| ✓ | MOLD TEMP | 93.3 | | 71.1 | 93.3 | C |
| ✓ | TLNJ | 1 | | 1 | 5 | SEC |

[OPTIMIZE]

RESPONSES (Y'S) — 136

| OPT | NAME | VALUE | STD DEV | OPT TYPE | LSL (92) | TARGET (94) | USL (96) | DPMO (150) | CPK | UNITS |
|---|---|---|---|---|---|---|---|---|---|---|
| ✓ | MELTP | 81.03661 | 0 | MINIMIZE ▽ | | 0 | 140 | 0 | 1666667 | MPa |
| ✓ | TCYCLE | 16.39937 | 0 | TARGET ▽ | 10 | 20 | 30 | 0 | 1666667 | SEC |
| ✓ | TOTALCOST | 1.02875 | 0 | MINIMIZE ▽ | | 0 | 1.15 | 0 | 1666667 | $/PART |

98 ↑

ADDITIONAL CONSTRAINTS — 152

| OPT | DESCRIPTION | FORMULA | | | [ADD] | > | [CHECK] | = | [DELETE] | < | STATUS | # STARTING POINTS | 10 |

154

OTHER OPTIMIZATION GOALS — 160

| OPT | DESCRIPTION | FORMULA | | | [ADD] | TYPE | [CHECK] | TARGET | [DELETE] | WEIGHT | [OPTIMIZE] | SCALE |

METHOD, SYSTEM AND STORAGE MEDIUM FOR OPTIMIZING A PRODUCT DESIGN

CROSS REFERENCE TO RELATED APPLICATIONS

This application claims the benefit of U.S. provisional patent application No. 60/162,447 filed Oct. 29, 1999, the entire contents of which are incorporated herein by reference.

BACKGROUND OF THE INVENTION

The invention relates to a method and system for evaluating a product design. The task of generating, evaluating and implementing a product design is a formidable one. Typically, product designs are generated by design personnel and put through a process often referred to as design review. In design review, individuals skilled in design, production, inspection, packaging, etc. evaluate designs. This often leads to re-design and further design review cycles delaying new product introduction. Once a product design is selected, prototypes may be produced using different materials and/or manufacturing processes. Although the selection of materials and manufacturing processes is performed by those skilled in the art, this process is still an iterative trial and error process that often results in changes to the design accompanied by additional prototyping. This cycle delays new product introduction and is often focused on internal metrics rather than customer metrics.

A product design may be represented by product factors (e.g., material, processing parameters, dimensions) that affect product responses (e.g., cost, performance). The factors and responses define a design space. Much of the above-described iterative cycle conventionally performed in the art is an attempt to locate a region in the design space in which product factors and product responses are within desired limits or constraints. While locating a region in a design space where design criteria are met is helpful, there may exist an optimum point in the design space where responses are optimized thus enhancing the product. Thus, there is a need in the art for a system that improves designs by allowing a designer to optimize responses.

BRIEF SUMMARY OF THE INVENTION

An exemplary embodiment of the invention is a method for optimizing a product design. The method includes specifying a plurality of application parameters for the product. A plurality of predetermined factors and responses are obtained in response to the plurality of application parameters. A transfer function is obtained which relates at least one factor to at least one response. The transfer function is optimized in response to user-defined optimization criteria to generate an optimized factor and an optimized response. The optimized factor and the optimized response are then displayed. Also disclosed are a system and storage medium for implementing the method.

BRIEF DESCRIPTION OF THE DRAWINGS

FIG. 3 depicts an exemplary interface to an engineering design calculator;

FIG. 4 depicts an exemplary interface for entering application factors;

FIG. 5 depicts an exemplary interface for selecting materials;

FIG. 6 depicts an exemplary interface for entering responses;

FIG. 7 depicts an exemplary interface for entering manufacturing factors;

FIGS. 8A and 8B, an exemplary factor/response summary;

FIG. 9 depicts an exemplary interface with a DOE module;

FIG. 10 depicts exemplary design of experiments data;

FIG. 11 depicts an exemplary interface for optimization;

DETAILED DESCRIPTION OF THE INVENTION

Figure 1:
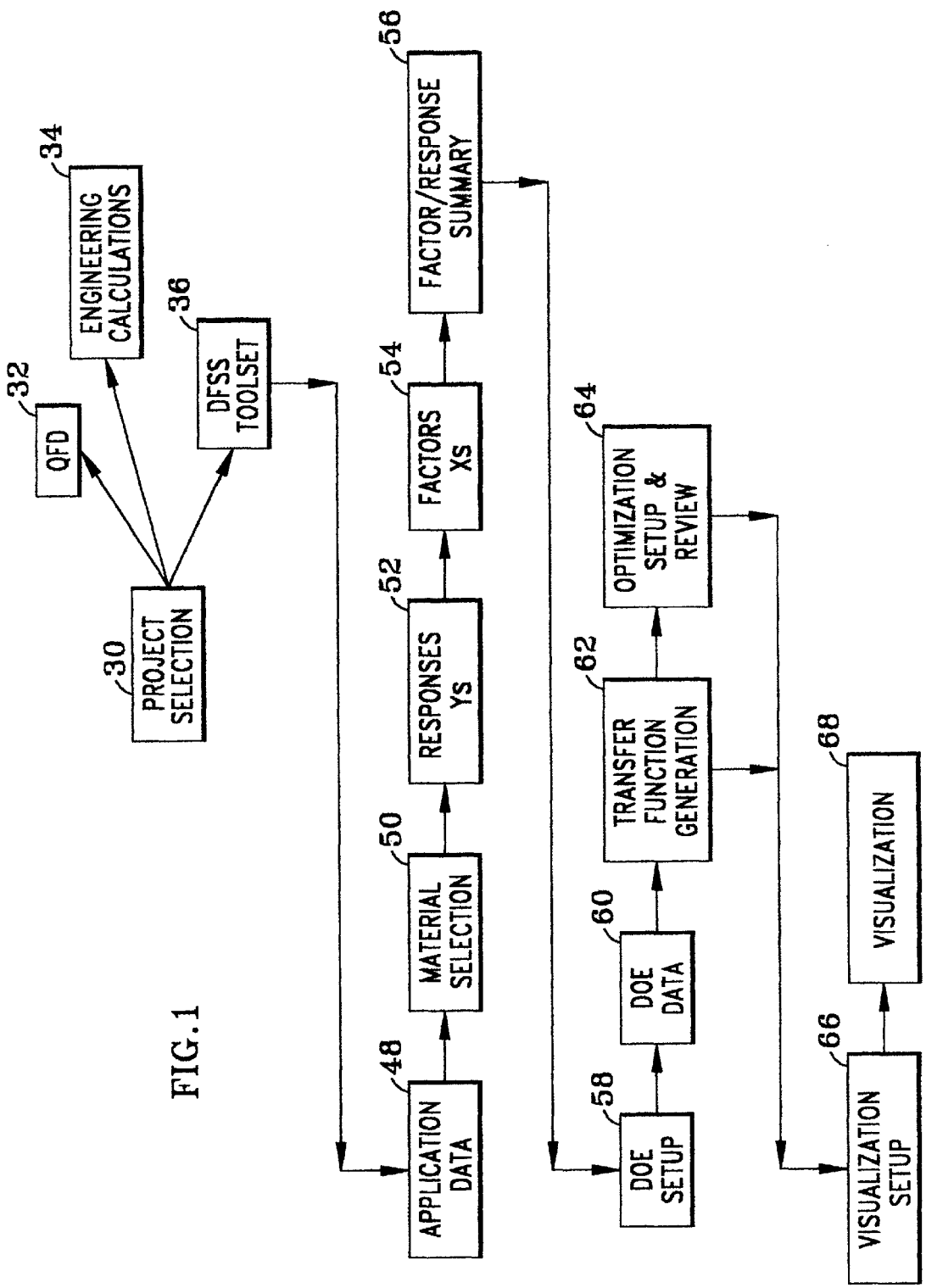
FIG. 1 is a flowchart of a process for designing a product in an exemplary embodiment of the invention.
Figure 2:
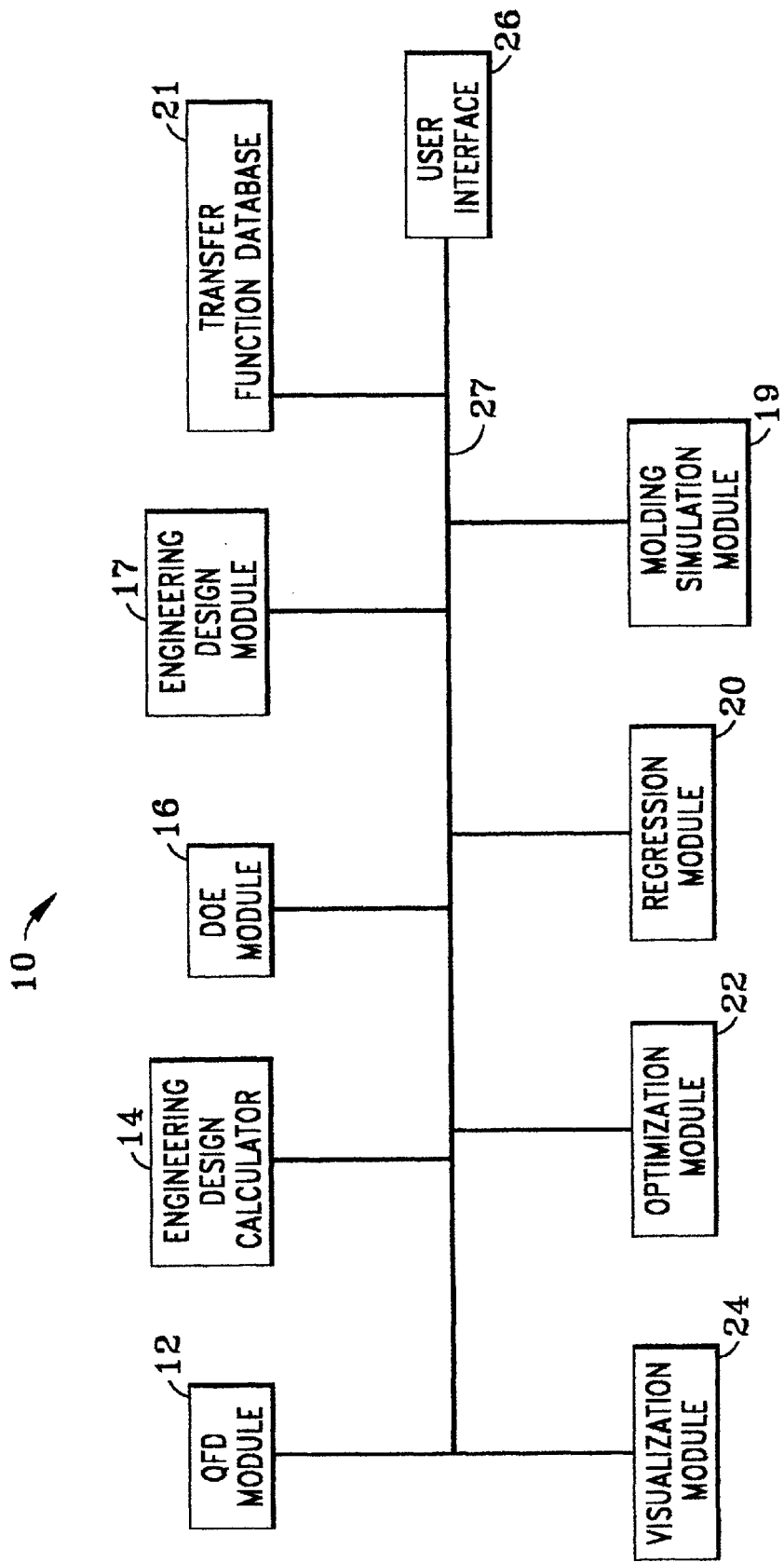
FIG. 2 is a block diagram of a system for designing a product.

An exemplary embodiment of the invention is a method and system for designing a product. As used herein, product is intended to have a broad meaning encompassing a variety of items. Specific examples of product designs are provided, but do not limit the scope of the invention. FIG. 1 is a flowchart of a process for designing a product and FIG. 2 is a block diagram of a product design system shown generally at 10. As the user goes through the process shown in FIG. 1, parts of the product design system 10 are utilized as described herein. As shown in FIG. 2, the product design system 10 includes a number of modules for performing certain functions during the design process.

Shown in FIG. 2 are a quality function deployment (QFD) module 12, an engineering design calculator 14, a design of experiments (DOE) module 16, a regression module 20, an optimization module 22 and a visualization module 24. Each module may be implemented through a software application implemented by a general purpose computer. The modules may be implemented on a single general purpose computer and accessed by the user through a user interface 26. Alternatively, the modules may be implemented on a plurality of general purpose computers remotely located from each other. The user interface 26 may access the various modules over a network 27 such as a local area network (LAN), wide area network (WAN), global network (e.g., Internet), etc. The modules may be implemented on computers which act as servers for multiple client computers. The user interface may include a user interface application (e.g., web browser) or interfacing with one or more servers that execute software applications corresponding to the modules shown in FIG. 2.

Referring to FIG. 1, the process for designing a product will now be described. The process begins at step 30 where the user selects a desired task such as quality function deployment (QFD) at step 32, engineering calculations at step 34 or use of a design for six sigma (DFSS) toolset at step 36. If the user selects QFD at step 32, the QFD module 12 is accessed. The QFD module 12 allows the user to perform a quality function deployment process in which process variables or product design parameters (often referred to as key control parameters (KCPs) or factors) are analyzed to determine effects on critical to quality parameters (CTQs) or responses. The use can define CTQs and determine the effect that KCPs have on CTQs. Conventional QFD applications software may be used to allow the user to define CTQs and analyze the interaction between KCPs and the CTQs.

If the user selects engineering calculations at step 34, the engineering design calculator 14 is accessed. The engineering design calculator 14 allows the user to execute calculations for a single set of conditions. FIG. 3 depicts an exemplary interface to the engineering design calculator 14 which is directed to performing calculations related to molding of plastic components. The engineering design calculator 14 allows the user to select material through a select material icon 40. This connects the user to a database of plastics which includes parameters of the plastics such as cost, hardness, etc. The user can select different materials to view the effect that different materials have on certain responses or Y's. The user can also select a geometry for the molded plastic component as shown at geometry selection option 42.

The user then enters values 45 for factors 44 (or X's) related to the plastic component and the molding process. The values 45 are then used to compute responses 46 (or Y's) which provide information such as cycle time and cost to the user. The calculations which derive the responses 46 from the factors 44 are based on predetermined functions. The engineering design calculator 14 performs calculations based on a single set of factors 44. Thus, for the user to see the effect of a change in a factor 44 (e.g., mold temperature) on a response 46 (e.g., total cost), the user must change the value 45 of a factor 44 and recalculate the responses 46. Thus, the engineering design calculator is used to generally determine the effect of factors 44 on responses 46, but more robust tools are used, as described herein, to optimize one or more responses 46.

If the user selects DFSS toolset at step 36, the process flows to step 48 where the user enters application factors concerning the product to be manufactured. The application factors define the product to be manufactured and generally will not vary with materials or processing parameters. FIG. 4 depicts an exemplary user interface for entering the application factors. As shown in FIG. 4, the user can select a geometry at geometry selection area 70 and can specify values 73 for application factors 72. The application factors shown in FIG. 4 are directed to a plastic part. It is understood that other types application factors may be used given the application and the invention is not limited to plastic components.

At the application factor entry step 48, the user can also enter statistical data in addition to the value 73 for each application factor 72. As shown in FIG. 4, the user can enter a standard deviation 74, a low limit 76 and a high limit 78 for each application factor. One or more of the statistical data may be used in the design of experiments process described herein. The user can specify that an application factor 72 be used in a design of experiments (DOE) by checking a design of experiments indicator 80. Typically, the user enters a low limit 76 and/or a high limit 78 if an application factor is to be used in a design of experiments. The application factors 72 may also include one or more user-defined application factors 82. Several of the application factors 72 are predefined. The user-defined application factors 82 allow the user to enter an application factor that is not provided for in the predetermined application factors and have this user-defined application factor 82 considered in a subsequent design of experiments.

Once the application factors 72 have been entered, flow proceeds to step 50 where the user selects a material to be used in forming the product. FIG. 5 is an exemplary interface for selecting materials. The user can identify a material through a select material icon 86 which may direct the user to a database of commercially available materials. If the user selects a commercially available material, the material characteristics (cost, hardness, melt temperature, etc.) are contained in the database and are accessible during later stages of the design process. The engineering design calculator 14, described above, may be used to help the user select appropriate materials for a particular application by providing responses 46 for a given material. Instead of selecting a predefined material, the user may define characteristics of a material that is not commercially available. For example, the user may define a custom material by entering material characteristics (cost, hardness, etc.) that are not realized by any commercially available material. This allows the user to design a product based on non-existing materials and evaluate whether the expense in generating the custom material is warranted.

Once the user has selected a material, either predefined or user-defined, at step 50, flow proceeds to step 52 where the user enters responses. FIG. 6 is an exemplary interface for entering responses 90. The responses 90 represent parameters that the user may want to control or optimize. For each response, the user can enter statistical data including a low limit 92, a target value 94 and a high limit 96. The low limit 92, target value 94 and/or high limit 96 may all be used in the design of experiments process described herein. The user can also define a type of optimization to be performed on a response 90 through an optimization indicator 98. As described herein, the system can determine factors so that one or more responses are optimized. The optimization indicator 98 allows the user to define the type of optimization (e.g., minimize, maximize, meet a target value, etc.). The user can designate that a response 90 be used in a subsequent design of experiments process by selecting a design of experiments indicator 100. The responses 90 may also include one or more user-defined responses 102. Several of the responses 90 are predefined. The user-defined responses 102 allow the user to enter a response that is not provided for in the predetermined responses and have this user-defined response 102 considered in the design of experiments and optimization steps described herein. The responses shown in FIG. 6 are directed to a molding a plastic part. It is understood that other types of responses may be used given the application and the invention is not limited to plastic components.

Once the user has defined responses 90, predefined and/or user-defined, at step 52, flow proceeds to step 54 where the user enters manufacturing factors. FIG. 7 depicts an exemplary user interface for entering the manufacturing factors 108. The manufacturing factors 108 represent factors in the manufacturing process that may be controlled or modified. The user can specify a value 109 for manufacturing factors 108. The user can also enter statistical data in addition to the value 109 for each manufacturing factor 108. As shown in FIG. 7, the user can enter a standard deviation 110, a low limit 112 and a high limit 114 for each manufacturing factor 108. One more of the statistical data may be used in the design of experiments process described herein. The user can specify that a manufacturing factor 108 be used in a design of experiments (DOE) by checking a design of experiments indicator 116. Typically, the user enters a low limit 112 and/or a high limit 114 if a manufacturing factor is to be used in a design of experiments. The manufacturing factors 108 may also include one or more user-defined manufacturing factors 118. Several of the manufacturing factors 108 are predefined. The user-defined manufacturing factors 118 allow the user to enter a manufacturing factor that is not provided for in the predetermined manufacturing factors and have this user-defined manufacturing factor 118 considered in a subsequent design of experiments. The manufacturing factors shown in FIG. 7 are directed to a plastic molding process. It is understood that other types manufacturing factors may be used given the application and the invention is not limited to manufacturing of plastic components.

Once the manufacturing factors, predefined and/or user-defined, have been entered at step 54, flow proceeds to step 56 where the user is presented with a factor/response summary such as that shown in FIGS. 8A and 8B. As shown in FIG. 8, the factor/response summary includes application factors 72, user-defined application factors 82, manufacturing factors 108 and user-defined manufacturing factors 118. In addition, miscellaneous or other factors 122 may also be included which do not correspond to the categories of application factors, user-defined application factors, manufacturing factors and user-defined manufacturing factors. The term factors, as used herein, is intended to have a broad meaning and is not limited to the particular examples or categories described above. Instead of progressing through steps 48, 50, 52 and 54, a user may proceed directly to step 56 and enter factors and responses as described above. Steps 48, 50, 52 and 54 are directed to a limited set of factors or responses and may help focus the user on specific aspects of the application. An experienced user, for example, may proceed directly to step 56 and enter factors.

The ability to enter user-defined application factors, user-defined materials, user-defined responses and user-defined manufacturing factors allows the system 10 to simulate manufacturing of products based, in part, on hypothetical, user-defined data. The factors, materials and responses, and their interrelationships may be defined based on existing simulation designs, empirical data, scientific analysis (e.g., thermodynamics, physics) and hypothetical, user-defined data. This provides a powerful tool for the designer in that user-defined data can be entered along with established data. The design of experiments, transfer function generation and optimization, described herein, is performed in response to the user-defined data.

The factor/response summary also includes responses 90 and user-defined responses 102. As shown in FIGS. 8A and 8B, a value 126 may be calculated for responses 90 and user-defined responses 102. The calculations are performed by the engineering design calculator 14. This provides the user with a general indication of how factor values effect response values. If the user wants to determined how changes in a factor effect a response, the user must alter the value of a factor and instruct the engineering design calculator to recalculate the responses. The user may view the factor/response summary and determine that certain responses (e.g., total cost) are too far from desired values and return to prior steps, such as material selection to effect the response. To optimize responses, more sophisticated tools are used as described herein.

Once the user is satisfied with the factor/response summary provided in step 56, flow proceeds to step 58 where the design of experiments routine is initiated. FIG. 9 depicts an exemplary user interface with the DOE module 16 for initiating a design of experiments. The DOE module 16 is a design of experiments software application as described above. The DOE module 16 may be implemented using commercially available design of experiments software applications. As shown in FIG. 9, the user sets up the design of experiments by selecting a DOE type through DOE type icons 130. The user can select a default DOE, launch a DOE advisor to help select the appropriate DOE or specify a custom DOE. The user is also presented with an identification of the materials 132, factors 134 and responses 136 that are to be considered in the design of experiments as selected by the user through DOE indicators.

Once the design of experiments has been setup in step 58, flow proceeds to step 60 where the design of experiments data is generated. The DOE module 16 performs the design of experiments process to generate design of experiments data. FIG. 10 depicts exemplary design of experiments data. For each material 132, the design of experiments module 16 perturbs the factors 134 to assume values within a range defined by a low limit and a high limit and obtains values for responses 136. The low limit and high limit may be taken from the appropriate application factors or the manufacturing factors entered by the user through steps 48 and 54, respectively. Design of experiments data is generated for each material 132 identified in the DOE setup step 58. For each material, a design space is generated corresponding to the relationship between factors and responses.

To perform the DOE and compute the values for responses 136, the user can select a Perform DOE icon 137. This initiates the DOE process in which values are determined for each response 136. The user can also select a portion of the DOE data for computation of values by selecting the Perform Area icon 139. The user can then select a subset of the DOE data (e.g., lines 1–3) and determined values for responses 136 for only this subset of DOE data. The DOE module determines the values for responses 136 by calling one or more other application modules. For example, the Melt Pressure to Fill may be calculated by an engineering design module 17 (e.g., software application) that is initiated by the DOE module 16. The engineering design module 17 returns the value for Melt Pressure to Fill and this value is added to the DOE data. The Total Cycle Time may be derived by another software module such as a molding simulation module 19. The modules used to derive values for responses 136 may have access to all the factors provided by the user. The modules called by the DOE module 16 to obtain values for responses can be established by the user or a system administrator. Alternatively, certain DOE responses 136 are determined by experimental data and thus, the user must enter the responses 136 based on experimental data.

Once the design of experiments process is completed, flow proceeds to step 62 where one or more transfer functions are generated which mathematically relate the factors 134 to responses 136 for each material 132. The regression module 20 performs regression on the design of experiments data to generate the transfer functions which mathematically relate the factors 132 to the responses 136 for each material. The transfer functions may be stored in a transfer function database 21 for use in subsequent applications.

Once the transfer functions are generated, flow proceeds to step 64 where optimization is performed. Optimization is performed by optimization module 22. The user defines the type of optimization through a user interface such as that shown in FIG. 11. For a given material 132, the user can optimize one or more responses 136 in multiple ways using an optimization indicator 98. In addition, the user can enter low limit 92, target value 94, high limit 96 as described above with respect to FIG. 6. These values may be carried over from step 52 where the responses 136 were identified by the user or modified by the user. For example, as shown in FIG. 11, the user has indicated that the Melt Pressure to Fill to be minimized, the Cycle Time be a predetermined target value and the Total Cost be minimized. The optimization module 22 uses the transfer functions generated by the regression module 20 and determines the appropriate values for factors 134 to optimize the responses 136 as identified by the user. In addition, the optimization module 22 can determine statistical factors such as defects per million opportunity (DPMO) 150. A defect occurs when a response value exceeds an upper or lower limit. The DPMO value can be used to generate a Zst value which is commonly used in the six sigma design process to evaluate designs. Based on normal distributions, a DPMO value of 3.4 equals a Zst score of 6 meaning that the design meets the six sigma quality standards.

Additional constraints 152 on the optimization can entered which will impose further limits on the optimization beyond those defined by optimization indicators 98. For example, the user may specify that the product of Mold Temperature and Melt Pressure to Fill be less than a predetermined value. The user enters this constraint in the additional constraints field 152 by entering a mathematical representation of the constraint and selecting a optimize indicator 154. The constraint serves as a boundary in the design space preventing the optimization module from producing a solution that violates the constraint.

Additional optimization may be performed through the other optimization field 160. The optimization performed on responses 136 assumes that all three responses are equally important to the user. The other optimization field 160 allows the user to assign a weight to one or more responses 136 to generate a global transfer function and to perform optimization on the global transfer function. For example, if Melt Pressure to Fill (meltP) was three times more critical than Cycle Time (tcycle) and Total Cost (totalCost), the user may enter the following relationship in the other optimization field 160.

$$Y=3(meltP)+tcycle+totalCost.$$

The meltP response has been modified by a weight (e.g., 3) to reflect its importance. The optimization module 22 can then optimize on the variable Y. The user requests this global optimization by defining the global transfer function in the other optimization field 160 and selecting an optimization indicator 161.

Figure 12:
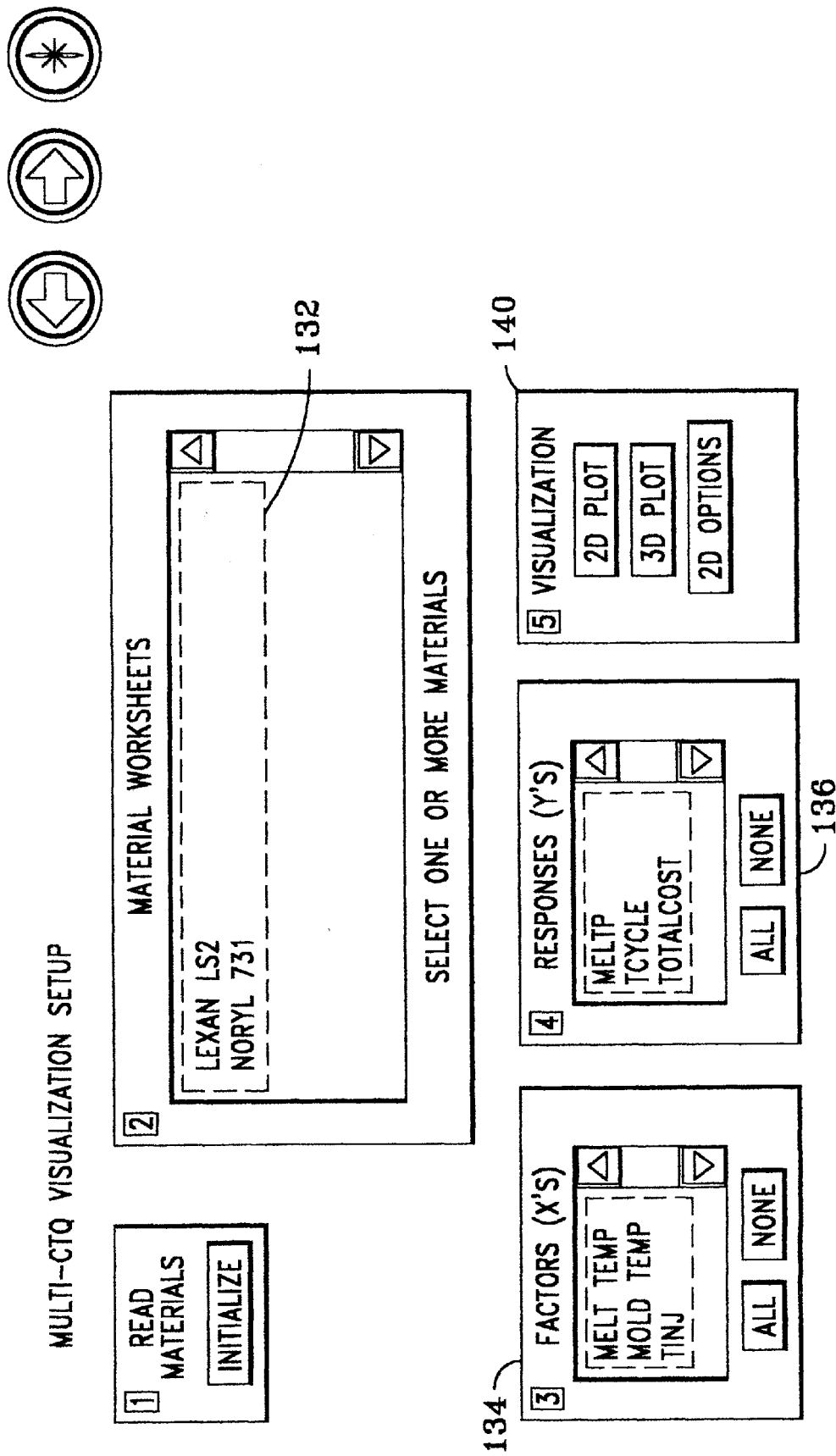
FIG. 12 depicts an exemplary interface for setting up a visualization.
Figure 13:
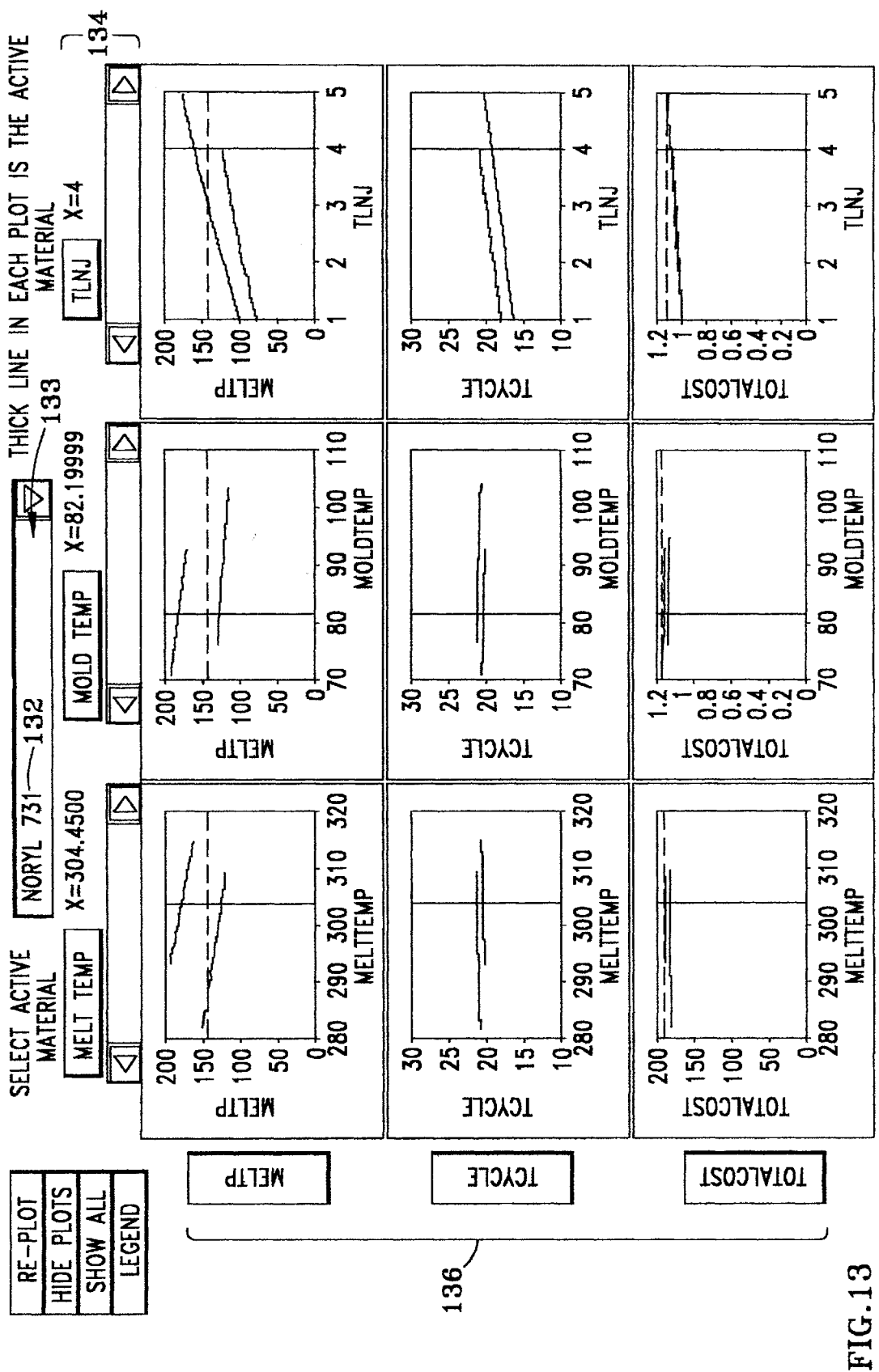
FIG. 13 depicts an exemplary visualization for two materials.

Once the factors 134 have been optimized based on the optimization criteria identified by the user, flow proceeds to step 66 where the user can setup visualization of the factors 134 and responses 136 for each material 132. FIG. 12 depicts an exemplary user interface for setting up the visualization. The user can select the materials 132, factors 134 and responses 136 which are to be displayed and select the type of display through a visualization identifier 140. FIG. 13 depicts an exemplary visualization for two materials 132. Each of the responses 136 is plotted against each factor 134 for each material. Since two materials were specified in the visualization setup in FIG. 12, two plots are presented on each graph. The user can select the active material through a drop down menu 133 and the active material (i.e., the material for which the optimization points are shown) is distinguished from other materials (e.g., the active material is shown with a thick line or a different color). Each graph also includes the optimization data entered by the user in the optimization step 64. For example, as shown in the plot of Melt Pressure to Fill (meltP) versus Melt Temperature (meltTemp), a horizontal line is provided at the upper limit of 140 MPa specified by the user. The optimum value for Melt Temperature is shown as a vertical line at 304.45 degrees C. Thus, the user can see the optimum value for the Melt Temperature as determined by the optimization module 22 and the user can see that the Melt Temperature must remain above a certain value (approximately 290 degrees C.) to have the Melt Pressure to Fill remain below the upper limit of 140 MPa. The other plots in FIG. 13 may similarly depict the optimum value for a factor 134, a low limit 92 and a high limit 96.

Figure 14:
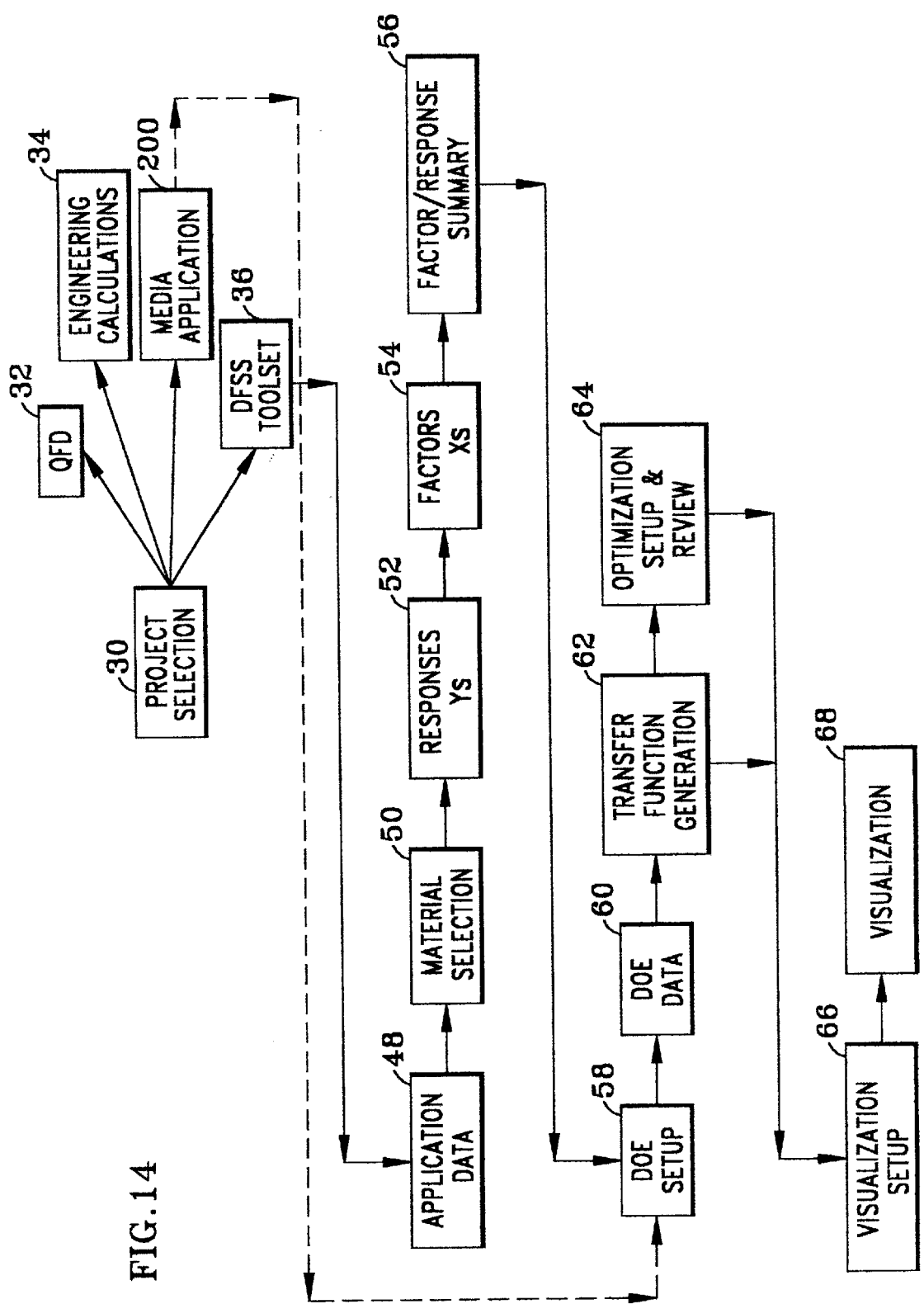
FIG. 14 is a flowchart of a process for designing a product in an alternate embodiment of the invention.

FIG. 14 is a flowchart of a method for optimizing a product design in an alternate embodiment of the invention. FIG. 14 is directed to the optimization of a design for optical media, but it is understood that the invention is not limited to optical media. The term product is used to generically refer to a variety of items for which a design may be optimized.

Figure 15:
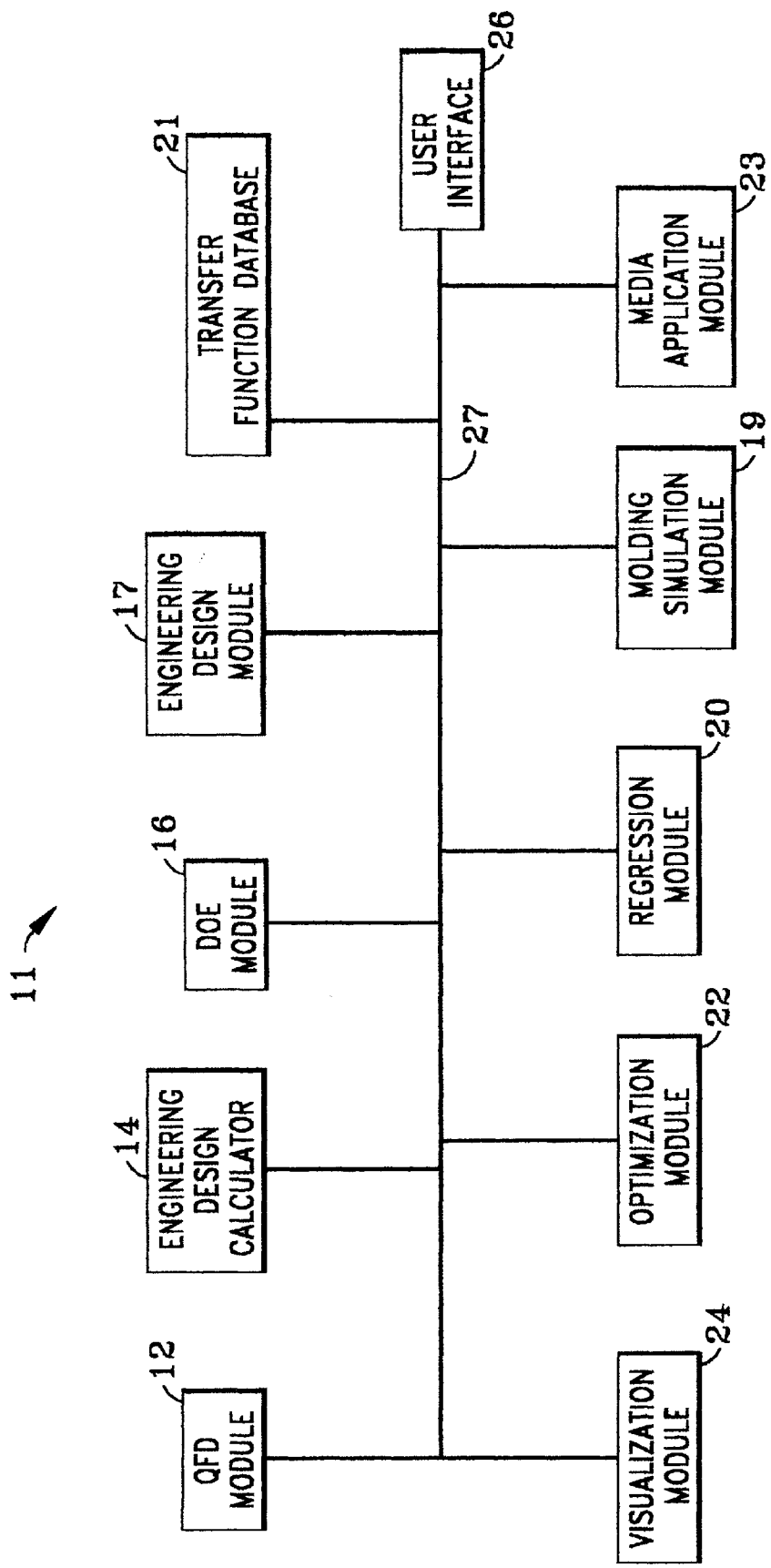
FIG. 15 is a block diagram of an alternate system for designing a product; and, FIG. 16 depicts an exemplary interface to media application module.

As shown in FIG. 14, the process includes the steps described above with reference to FIG. 1 and further includes a media application step 200. The media application step 200 focuses the user on the manufacturing of optical media (e.g., compact discs) to enhance responses such as yield, throughput and cycle time. As shown in FIG. 14, the media application step 200 allows the user to bypass steps 48–56 and proceed to the DOE setup 58, if necessary, once the media application step 200 is completed. The media application step 200 is directed to applications where the product being manufactured is optical media for use in products such as compact discs. Given the specificity of the application, the factors and responses are typically predetermined as described herein. FIG. 15 is a block diagram of a system 11 in an alternate embodiment of the invention. The system 11 is similar to system 10 in FIG. 2 and includes media application module 23. The media application module 23 may be implemented through a software application executed by a general-purpose computer. The media application module 23 is coupled to other modules and the user interface through network 27. As described above with reference to FIG. 2, the network 27 may be the Internet and the user interface may be a user interface application (e.g., web browser).

Figure 16:
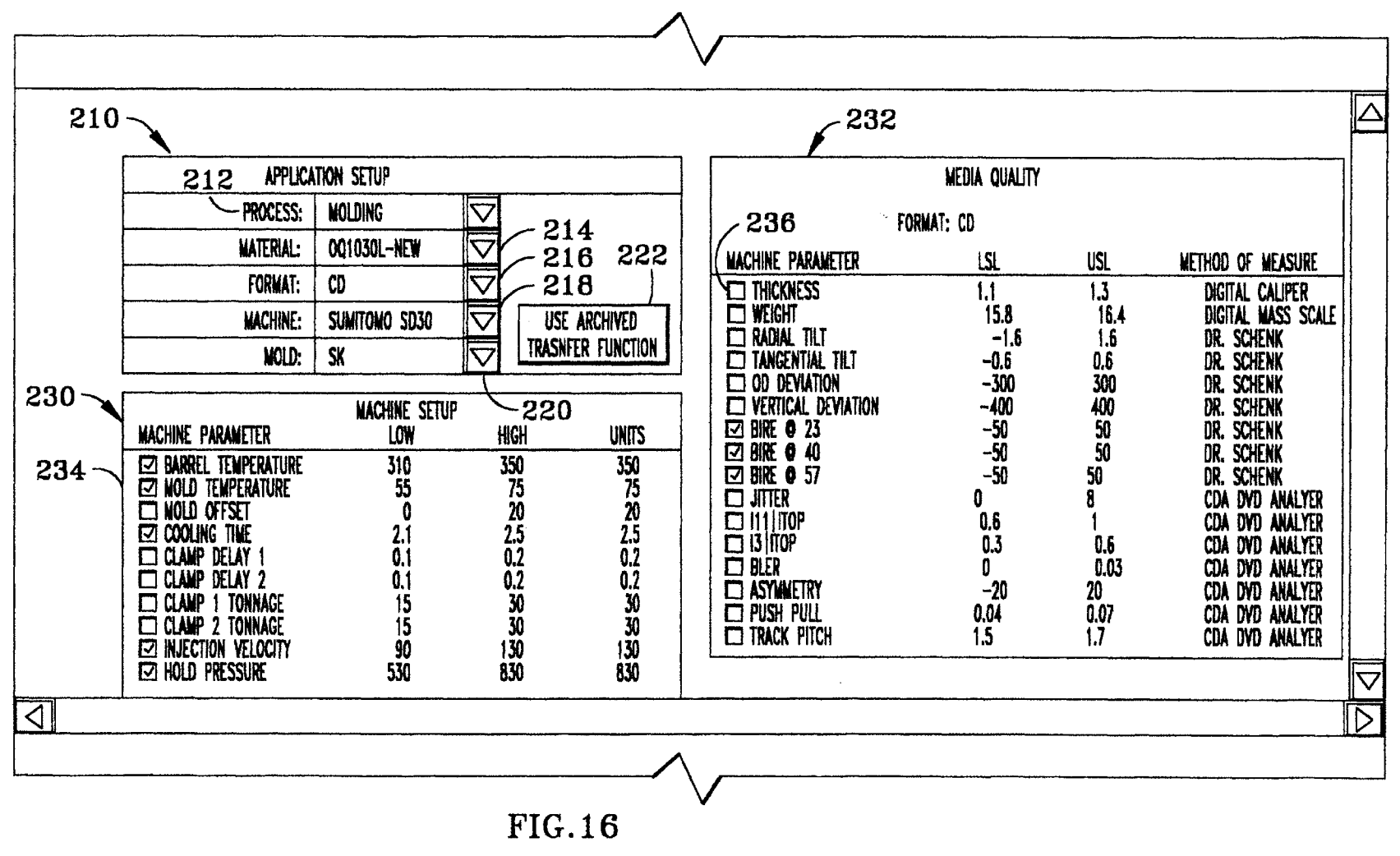

If the user selects the media application step 200, the user defines the media application through a user interface such as that shown in FIG. 16. As shown in FIG. 16, the user interface allows the user to define application parameters through an application setup region 210. The application setup region 210 includes a process field 212 that defines the type of process to be performed to generate the optical media. Exemplary processes include molding, metalization, bonding, curing, printing and mastering. A material field 214 defines the type of material to be used in forming the optical media. A format field 216 defines the format for the optical media to be manufactured (e.g., compact disc, digital video disc, etc.). A machine field 218 defines the machine used to form the optical media. A mold field 220 defines the type of mold used. Because the optical media applications are governed by industry standards, the application parameters in the application setup region 210 may be selected using a drop down menu in which the user is presented with predetermined selections for each parameter. Alternatively, the user may enter parameters in each field that are not already predefined.

Once the user has entered application parameters in application setup region 210, the user can select the use of an archived transfer function through icon 222. The use of archived transfer functions in transfer function database 21 allows for rapid optimization without the need to perform design of experiments and regression. This greatly facilitates the optimization of designs. For the user to select a predetermined transfer function, a transfer function must have been derived for the set of parameters entered in application setup region 210. Requesting an archived transfer function links the media application module 23 to the transfer function database 21 and accesses an existing transfer function for use in optimization step 64.

The media application module 23 also presents the user with a list of factors 230 and responses 232. The factors 230 are directed to the setup of the machine for manufacturing the optical media based on the parameters entered in application setup region 210. As shown in FIG. 16, the low and high values for each machine setup factor are provided automatically. The machine setup factors 230 are stored in a database which is indexed by the parameters in application setup region 210. Exemplary machine setup factors for a molding process are shown in FIG. 16. It is understood that other factors may be used. When the user enters the application parameters, the appropriate set of machine setup factors and low/high limits are retrieved and presented to the user. The user may alter the factors 230 and the high and low limits if desired. The factors 230 also include a design of experiments indicator 234 which the user selects to request that a factor 230 be used in a subsequent design of experiments if a predetermined transfer function has not been selected.

The responses 232 are directed to qualities of the optical media. As shown in FIG. 16, the low and high values for each response 232 are provided automatically. As discussed above, the qualities of certain optical media may be standardized and the low and high limits for responses 232 can be based on industry standards. The optical media quality responses 232 are stored in a database which is indexed by the parameters in application setup region 210. Exemplary optical media quality responses are shown in FIG. 16 for a molding process for a compact disc. It is understood that other responses may be used depending on the application parameters specified by the user. The user may alter the responses 232 and the high and low limits if desired. The responses 232 also include a design of experiments indicator 236 which the user selects to request that the response 232 be used in a subsequent design of experiments if a predetermined transfer function has not been selected.

As described above, an existing transfer function may be used if available. If an existing transfer function exists, and the transfer function meets the user's needs (i.e., the transfer function relates the factors and responses that the user is interested in), then the process can proceed to the optimization step 64 shown in FIG. 1. The user can specify optimization conditions and the archived transfer function is used as described above. If the archived transfer function does not relate the factors and responses of interest to the user, then flow proceeds to the design of experiments setup step 58 and a transfer function is generated as described above with reference to steps 58, 60 and 62. The user can then save the generated transfer function in transfer function database 21 for subsequent use.

Flow proceeds as described above through optimization step 64 and visualization steps 66 and 68.

The optical media application module 23 allows the user to retrieve relevant machine setup factors and optical media responses based on application parameters set by the user. This helps focus the user on factors and responses that are relevant to an application and eliminates undue experimentation in deriving sets of useful factors and responses. This facilitates introduction of a new machine or manufacturing of a new format. In addition, the availability of archived transfer functions expedites optimization. If a design of experiments requires experimental data to derive certain responses, the existence of a predetermined transfer function can greatly expedite the design process.

The system of FIG. 15 may be used to optimize designs for a variety of products and is not limited to optical media. The user may be presented with icons for different applications and can select the desired application. The transfer function database 21 contains transfer functions for a variety of applications thereby enabling rapid optimization with little or no experimentation needed. Of course, the system provides the ability to perform design of experiments and regression to generate transfer functions if needed.

As described above, the invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for optimizing a product design, the method comprising:

specifying a plurality of application parameters for the product design;

obtaining a plurality of predetermined factors and a user-defined factor in response to said plurality of application parameters;

obtaining a plurality of predetermined responses and a user-defined response in response to said plurality or application parameters;

obtaining a transfer function relating at least one factor to at least one response;

optimizing said transfer function in response to predetermined optimization criteria and user-defined optimization criteria to generate an optimized factor and an optimized response; and displaying said optimized factor and said optimized response.

2. The method of claim 1 wherein:
said specifying a plurality of application parameters includes specifying a material to be used in forming the product.

3. The method of claim 1 wherein:
said specifying a plurality of application parameters includes specifying a format for the product.

4. The method of claim 1 wherein:
said specifying a plurality of application parameters includes specifying a machine to be used in forming the product.

5. The method of claim 1 wherein:
said specifying a plurality of application parameters includes specifying a mold to be used in forming the product.

6. The method of claim 1 wherein:
said obtaining a transfer function includes retrieving an archived transfer function.

7. The method of claim 1 wherein said obtaining a transfer function includes:
performing a design of experiments routine to generate design of experiments data relating at least one factor to at least one response; and
performing regression to generate a transfer function in response to said design of experiments data.

8. The method of claim 1 wherein:
said product is optical media.

9. The method of claim 1 wherein:
said optimizing said transfer function includes assigning a weight to at least one of said predetermined responses and user-defined responses.

10. A system for optimizing a product design, the system comprising:
a user interface for specifying a plurality of application parameters for the product design;
an application module for obtaining a plurality of predetermined factors and a user-defined factor in response to said plurality of application parameters;
said application module obtaining a plurality of predetermined responses and a user-defined response in response to said plurality of application parameters;
a transfer function database containing a transfer function relating at least one factor to at least one response;
an optimization modules for optimizing said transfer function in response to predetermined optimization criteria and user-defined optimization criteria to generate an optimized factor and an optimized response; and
a visualization module for displaying said optimized factor and said optimized response.

11. The system of claim 10 wherein:
said application parameters include a material to be used in forming the product.

12. The system of claim 10 wherein:
said application parameters include a format for the product.

13. The system of claim 10 wherein:
said application parameters include a machine to be used in forming the product.

14. The system of claim 10 wherein:
said application parameters include a mold to be used in forming the product.

15. The system of claim 10 wherein:
said product is optical media.

16. The system of claim 10 wherein:
said optimizing said transfer function includes assigning a weight to at least one of said predetermined responses and user-defined responses.

17. A storage medium encoded with machine-readable computer program code for optimizing a product design, the storage medium including instructions for causing a computer to implement a method comprising:
receiving a plurality of application parameters for the product design;
obtaining a plurality of predetermined factors and a user-defined factor in response to said plurality of application parameters;
obtaining a plurality of predetermined responses and a user-defined response in response to said plurality of application parameters;
obtaining a transfer function relating at least one factor to at least one response;
optimizing said transfer function in response to predetermined optimization criteria and user-defined optimization criteria to generate an optimized factor and an optimized response; and
displaying said optimized factor and said optimized response.

18. The storage medium of claim 17 wherein:
said plurality of application parameters include a material to be used in forming the product.

19. The storage medium of claim 17 wherein:
said plurality of application parameters include a format for the product.

20. The storage medium of claim 17 wherein:
said plurality of application parameters include a machine to be used in forming the product.

21. The storage medium of claim 17 wherein:
said plurality of application parameters include a mold to be used in forming the product.

22. The storage medium of claim 17 wherein:
said obtaining a transfer function includes retrieving an archived transfer function.

23. The storage medium of claim 17 wherein said obtaining a transfer function includes:
performing a design of experiments routine to generate design of experiments data relating at least one factor to at least one response; and
performing regression to generate a transfer function in response to said design of experiments data.

24. The storage medium of claim 17 wherein:
said product is optical media.

25. The storage medium of claim 17 wherein:
said optimizing said transfer function includes assigning a weight to at least one of said predetermined responses and user-defined responses.

* * * * *